(12) United States Patent
Boodaghians et al.

(10) Patent No.: US 9,428,896 B2
(45) Date of Patent: Aug. 30, 2016

(54) MULTI-PORT ORBITAL VALVE

(71) Applicant: MAG AEROSPACE INDUSTRIES, INC., Carson, CA (US)

(72) Inventors: Razmik B. Boodaghians, Glendale, CA (US); Timothy Birbeck, Torrance, CA (US); Sebastien Weber, Irivne, CA (US); Nguyen Tram, Chino Hills, CA (US); Kevin Huang, Los Angeles, CA (US); David Beach, Seal Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 360 days.

(21) Appl. No.: 14/055,903

(22) Filed: Oct. 17, 2013

(65) Prior Publication Data

US 2014/0101837 A1    Apr. 17, 2014

Related U.S. Application Data

(60) Provisional application No. 61/714,912, filed on Oct. 17, 2012.

(51) Int. Cl.

| | |
|---|---|
| *E03D 1/00* | (2006.01) |
| *E03D 5/00* | (2006.01) |
| *E03F 1/00* | (2006.01) |
| *F16K 11/074* | (2006.01) |
| *B64D 11/02* | (2006.01) |

(52) U.S. Cl.
CPC ............... *E03D 5/00* (2013.01); *E03F 1/006* (2013.01); *F16K 11/074* (2013.01); *B64D 11/02* (2013.01)

(58) Field of Classification Search
CPC .......... E03D 5/00; E03F 1/006; F16K 11/074
USPC ....................................... 4/323, 321
See application file for complete search history.

(56) References Cited

U.S. PATENT DOCUMENTS

| | | | | |
|---|---|---|---|---|
| 2,781,787 | A | * 2/1957 | Johnson | ............ F16K 3/06 138/94.5 |
| 3,924,832 | A | 12/1975 | Babcock | |
| 4,713,847 | A | 12/1987 | Oldfelt et al. | |
| 5,133,853 | A | * 7/1992 | Mattsson | ............ E03F 1/006 210/104 |
| 6,216,285 | B1 | * 4/2001 | Olin | ............ E03F 1/006 4/321 |
| 6,325,356 | B1 | 12/2001 | Rozenblatt | |

(Continued)

FOREIGN PATENT DOCUMENTS

| | | |
|---|---|---|
| DE | 703613 C | 3/1941 |
| DE | 2413312 A1 | 10/1975 |

(Continued)

OTHER PUBLICATIONS

International Search Report and Written Opinion dated May 9, 2014 in Application No. PCT/US2013/065334, 12 pages.

(Continued)

*Primary Examiner* — Huyen Le
(74) *Attorney, Agent, or Firm* — Kilpatrick Townsend & Stockton LLP; Dean W. Russell; Kristin M. Crall

(57) ABSTRACT

Embodiments of the present invention relate generally to multi-port orbital valves for use in controlling the direction of fluids and mixed media, and find particular use in connection with toilet systems, such as vacuum toilet systems.

12 Claims, 8 Drawing Sheets

(56) References Cited

U.S. PATENT DOCUMENTS

| | | | |
|---|---|---|---|
| 6,353,942 B1 | 3/2002 | Pondelick et al. | |
| 6,370,709 B1 * | 4/2002 | Stradinger | E03F 1/006 137/588 |
| 7,533,426 B2 | 5/2009 | Pondelick | |
| 8,185,977 B2 * | 5/2012 | Seibt | B64D 11/02 4/305 |
| 8,607,370 B2 * | 12/2013 | Hoang | E03F 1/006 251/301 |
| 8,672,295 B2 | 3/2014 | Dhawan et al. | |
| 2012/0051977 A1 | 3/2012 | Boodaghians et al. | |
| 2013/0146783 A1 | 6/2013 | Boodaghians et al. | |
| 2014/0020167 A1 | 1/2014 | Rieger et al. | |
| 2014/0264123 A1 | 9/2014 | Weber et al. | |

FOREIGN PATENT DOCUMENTS

| | | |
|---|---|---|
| DE | 19819984 A1 | 1/1999 |
| EP | 2690015 A1 | 1/2014 |
| GB | 2203461 A | 10/1988 |
| WO | 2014062863 A2 | 4/2014 |
| WO | 2014151319 A2 | 9/2014 |

OTHER PUBLICATIONS

International Patent Application No. PCT/US2014/025464, Invitation to Pay Additional Fees and, Where Applicable, Protest Fee dated Jul. 7, 2014, 5 pages.
U.S. Appl. No. 13/833,426, filed Mar. 15, 2013.
U.S. Appl. No. 13/833,426, Office Action dated Oct. 6, 2014.
U.S. Appl. No. 13/833,426, Response to Office Action dated Feb. 4, 2015.
International Patent Application No. PCT/US2014/025464, International Search Report and Written Opinion dated Sep. 15, 2014, 17 pages.
U.S. Appl. No. 13/833,426, Notice of Allowance dated Aug. 24, 2015.
International Patent Application No. PCT/US2014/025464, International Preliminary Report on Patentability dated Sep. 24, 2015.
International Patent Application No. PCT/US2013/065334, International Preliminary Report on Patentability dated Apr. 30, 2015.

* cited by examiner

MULTI-PORT ORBITAL VALVE

CROSS REFERENCE TO RELATED APPLICATIONS

This application claims the benefit of U.S. Provisional Application Ser. No. 61/714,912, filed Oct. 17, 2012, titled "Multi-Port Orbital Valve," the entire contents of which are hereby incorporated by reference.

FIELD OF THE INVENTION

Embodiments of the present invention relate generally to multi-port orbital valves for use in controlling the direction and/or flow of fluids and mixed media, and find particular use in connection with toilet systems, such as vacuum toilet systems.

BACKGROUND

Aircraft and other passenger transport vehicles typically have on-board lavatories with vacuum toilet systems. These systems typically include a waste-receiving toilet bowl connected to a main waste tank via a sewer pipe or main waste line. A discharge or flush valve is typically mounted on the sewer pipe to selectively allow fluid communication between the toilet bowl and the main waste tank. To power the toilet system, the waste reservoir is maintained under a pressure that is substantially lower than the pressure in the waste-receiving toilet bowl, which is typically under the near-atmospheric pressure of the aircraft's passenger cabin. Thus, when the discharge valve is opened, the pressure differential between the bowl and the reservoir causes the waste in the bowl to be drawn through the pipe into the waste reservoir.

The vacuum created for the flushing action may either be via one or more vacuum pumps, or, in the case of an aircraft in flight, via a pressure differential. For example, aircrafts typically have a vacuum disposal system that applies a vacuum to pull waste media and flush water/spent water from toilets and/or sinks into an on-board waste water storage tank. The suction is generated either by the pressure differential between the pressurized cabin and the reduced pressure outside of an aircraft at high flight altitudes or by a vacuum generator at ground level or at low flight altitudes.

In vacuum waste systems, this differential pressure is what drives the collected mixed media (which can be human waste along with other waste items, such as paper products) from the toilet bowl into the accumulation point. The discharge valve should provide an interface for such a vacuum system without venting the pressure differential completely. It should also allow for the controlled addition of material into the ambient-pressure environment, while providing a leak-free obstruction that can be moved or rotated in a controlled manner so as to allow for the passage of a waste bolus from the ambient-pressure environment (e.g., the toilet bowl) to the low pressure environment (e.g., the waste tank). The discharge valve is then returned to its closed position in order to prevent further movement of media and/or waste into the waste tank until the next flush is activated.

Although efficient, vacuum toilets create a loud noise level during the flush cycle, due to the amount of vacuum that needs to be applied in order to cause the septic waste to travel from the toilet basin to the holding tank. The loud flushing sound is created when the flush valve opens. The differential pressure forcefully draws the waste down the drain, and the pressure differential must be large enough to cause the waste to flow the entire distance from the toilet basin to the septic holding tank. Because the main holding tank can be located quite far from the lavatory, the assignee of the present application has developed a two-stage flush system that uses an intermediate holding tank or reservoir. Aspects of this design are described in co-pending U.S. Ser. No. 13/804,539 titled "Two-Stage Flush and Grey Water Flush Systems and Devices." The intermediate tank described in that application functions as a transient tank between the toilet bowl and the main waste tank. It is generally positioned in fluid communication with the toilet bowl. In some embodiments, the intermediate tank is positioned beneath the toilet bowl in the lavatory plumbing. A first valve controls the flow from the toilet to the intermediate holding tank. A second valve (or valve system) controls the flow from the intermediate holding tank to the main waste tank. Improved features for the second valve or second valve system are provided herein.

BRIEF SUMMARY

Embodiments of the invention described herein thus provide improved multi-port orbital valves that are particularly designed for use with improved flushing systems and venting. In one embodiment, there is provided a valve, comprising: a valve housing enclosing a flush plate; the valve housing comprising a first opening and a second opening; the flush plate comprising a first opening, a second opening, an axis of rotation, wherein rotation of the flush plate with respect to the axis of rotation either (i) closes the first and second openings of the housing, (ii) allows the first opening of the housing to be open by aligning the first opening of the housing with the first opening of the flush plate, or (iii) allows the second opening of the housing to be open by aligning the second opening of the housing with the second opening of the flush plate.

DETAILED DESCRIPTION

Embodiments of the present invention provide a multi-port orbital valve system. In one aspect, the valve system functions as a flush valve for a vacuum toilet, particularly a vacuum toilet on-board a passenger transport vehicle. Although the valve system is described for use with a toilet system, and specifically for use with a vacuum toilet for use on-board a passenger vehicle such as an aircraft, it should be understood that this valve system 10 may be used with any other system that seeks to use a valve across a pressure differential situation and/or a valve that can transport fluid and/or mixed media. Examples of alternate uses include but are not limited to facility-based vacuum waste systems, facility-based vacuum transport systems, mixed media processes in oil and gas industries, conditional overboard venting in aerospace applications, or any other appropriate instance when a valve system is needed.

Figure 1:
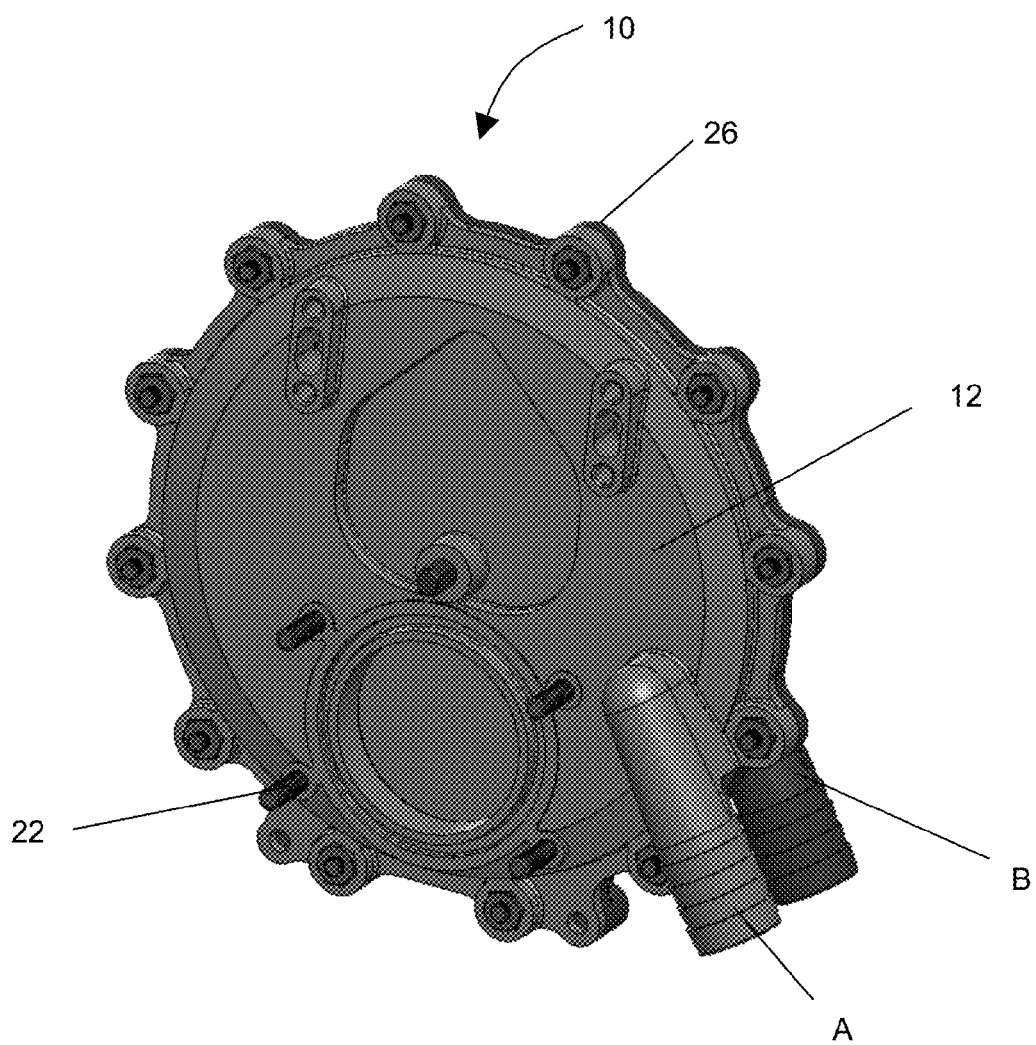
FIG. 1 shows a side perspective view of one embodiment of a valve system housing.
Figure 2:
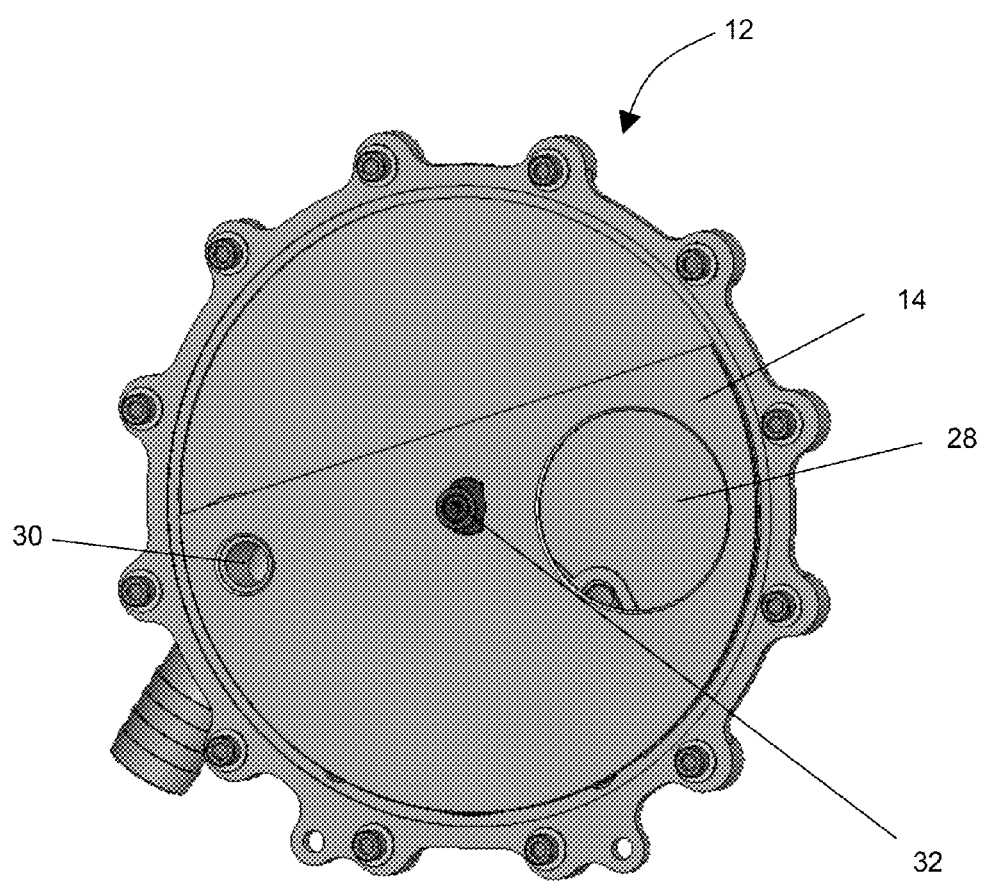
FIG. 2 shows a side perspective view of a valve system housing with one half of the housing removed to show the flush plate therein.
Figure 11:
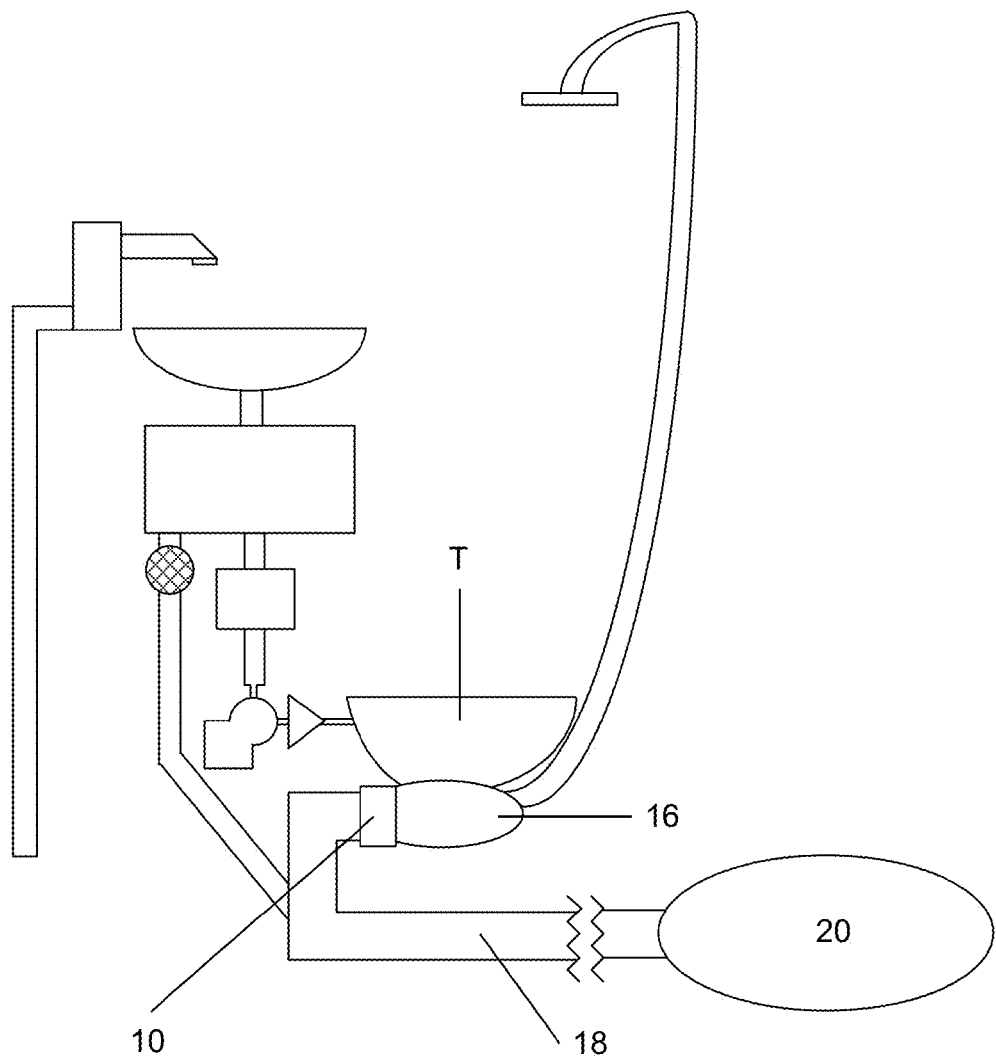
FIG. 11 shows a side plan view of a vacuum waste system using a valve system.
Figure 12:
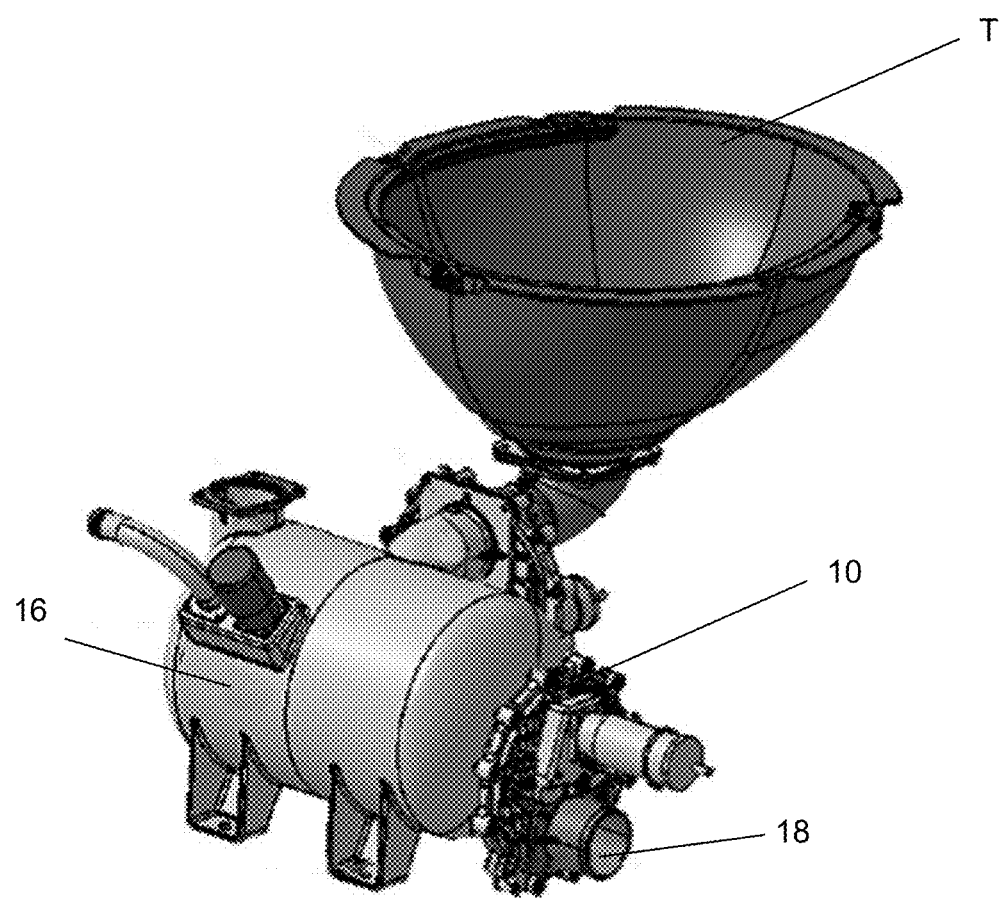
FIG. 12 shows a side perspective view of a toilet bowl that evacuates into an intermediate holding tank.

As shown in FIGS. 1 and 2, the valve system 10 includes a valve housing 12 which encloses a flush plate 14. This internal flush gate or plate 14 may be used to activate two separate gates of the housing. FIGS. 11 and 12 show an overview of one potential location and use for the exemplarity valve system provided herein. It should be understood, however, that the described valve systems may be useful for other applications that require a multi-port valve. In these figures, the valve system 10 is generally positioned between an intermediate holding tank 16, which is designed to receive and hold waste materials from a toilet, and the sewer line 18 that delivers waste materials to a main waste holding tank 20 on-board the vehicle. The intermediate holding tank 16 functions as a reservoir or transient tank, because it holds waste from an initial first stage flush. In the first stage flush, waste material and flush water is delivered from a toilet bowl T to the reservoir 16. The reservoir 16 is designed to hold the waste until the reservoir tank 16 becomes full, until a certain number of flushes has been reached, once a certain hydrostatic pressure is reached, or any other appropriate set stimuli. When it is time to empty the reservoir 16, a second flush stage occurs. In the second stage of the flush, the accumulated waste material and flush water is then delivered from the intermediate holding tank 16 to the main waste holding tank 20. The valve system 10 described herein helps manage the desired flush sequence, while also maintaining the desired pressure in the system and allowing the system to vent.

It should be understood that the features described herein may be useful in connection with other flush valve and mechanisms. For example, the present assignee has a related application for a mixed media flush valve pending, U.S. Ser. No. 13/833,426 for "Mixed Media Orbital Valve." One or more features described in that application may be incorporated into the multi-port orbital valve described herein, and vice versa.

The housing 12 of the valve system 10 has a media inlet 22 and a media outlet 24. In use, the media inlet 22 receives waste materials and fluid from the reservoir 16. The media outlet 24 provides a connection to the sewer pipe 18, which delivers the waste to the main waste tank 20 such that waste travels out of the valve system 10 through outlet 24. (It should be understood that the inlet 22 and outlet 24 may be interchangeable. The direction of flow is not specific to orientation of valve; the flow simply need enter on side of the housing and exit on the other side. The combined opening through the housing cross-section will be referred to as a collective opening 23 below.) The valve housing 12 also has a vent opening 26. The vent opening 26 functions to evacuate or vent air. It provides a pathway between the valve system 10 interior and the ambient conditions immediately outside valve.

Figure 14:
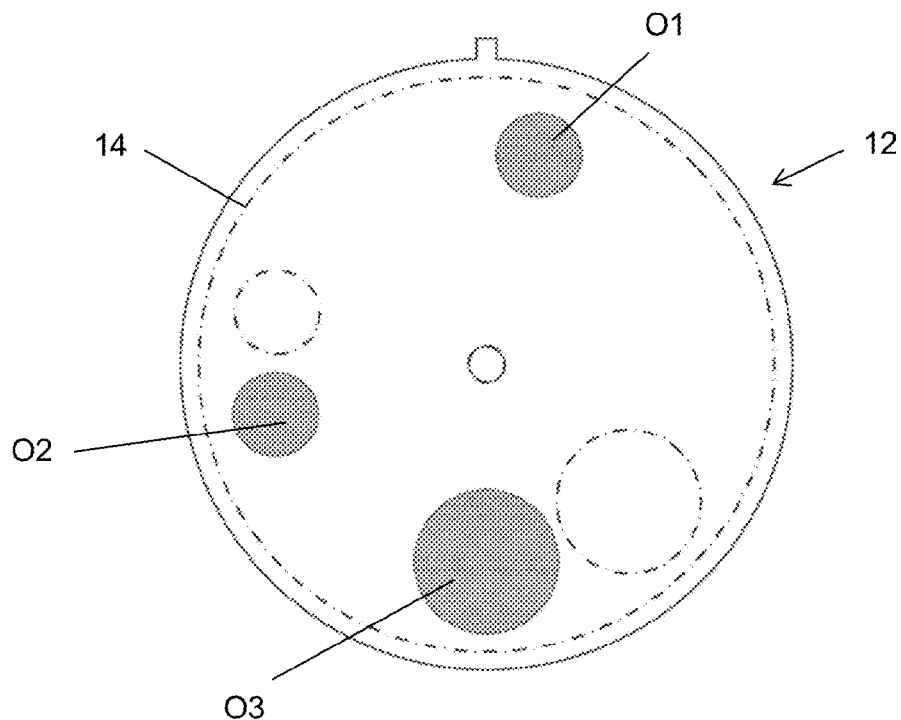
FIG. 14 shows one example of an alternate housing having more than two openings.

Although a housing 12 with two openings is shown, it should be understood that more than two openings may be provided, depending upon the surface area, the size of the openings, and the flush needs required. For example, a housing may be provided as having three, four, five, or more openings FIG. 14 shows a housing 12 having three openings, O1, O2, and O3. Further openings may be added as well, for example, four, five, or more openings may be provided. For example, in one embodiment, the additional opening may be provided as a supplemental vent. This vent may vent the system to an alternate location in order to control odor or for any other reason.

The housing 12 may be made of any appropriate material. In some instances, the housing is metallic, such as stainless steel or titanium. In other instances, the housing may be plastic. It one embodiment, the housing may be made of a thermoplastic resin. It one embodiment, the housing made of a polymeric material that has good mechanical, thermal (to resist high temperatures), and chemical (resistance) properties. Specific examples of potential materials include but are not limited to polymers, polyetherimides (such as Ultem resin), nylons, such as nylon D80 or nylon 11, polypropylenes, acrylonitrile butadiene styrenes, polyethylenes, stereolithography resins (such as Somos® NeXt), carbon composite materials, carbon fibers in an epoxy matrix, polycarbonates, or any other appropriate materials, or any combination thereof. Without wishing to be bound to any theory, it is believed possible that providing the housing out of a plastic-like material may help the housing recover its original shape in the event of any abnormal or unintended shaving action of the flush plate.

Figure 3:
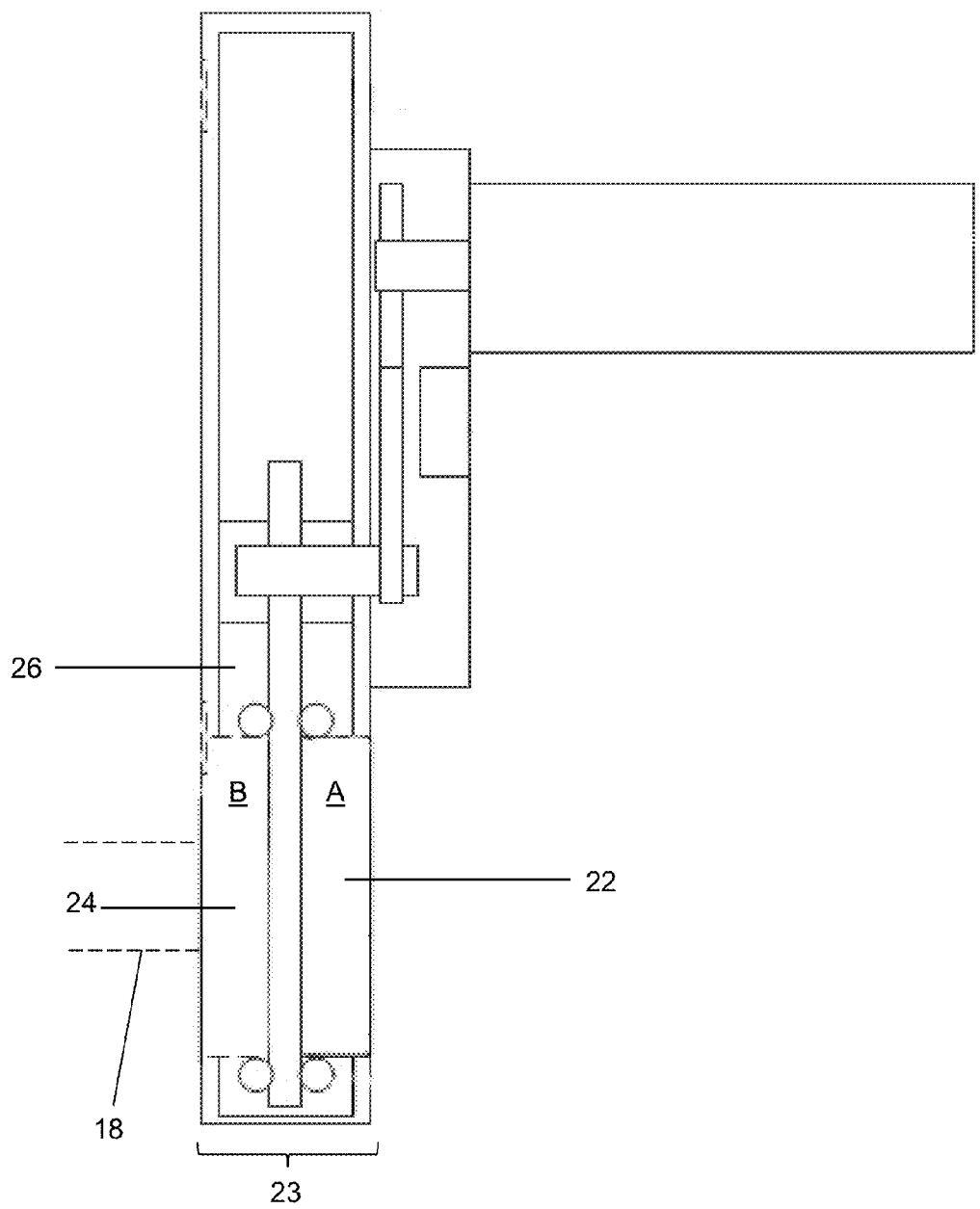
FIG. 3 shows a side cross sectional view of a valve system.

As shown in FIGS. 1 and 3, the housing 12 has two halves (A and B). The waste inlet 22/outlet 24 opening collectively form a first opening 23 that extends through both halves A, B of the housing 12. The vent opening 26 also extends through both halves of the housing 12. A flush plate 14 is provided between the two halves in order to control the opening and closing of the inlet 22/outlet 24 (collectively, the opening 23) and the vent 26 opening as desired.

Figures 4, 5, 6:
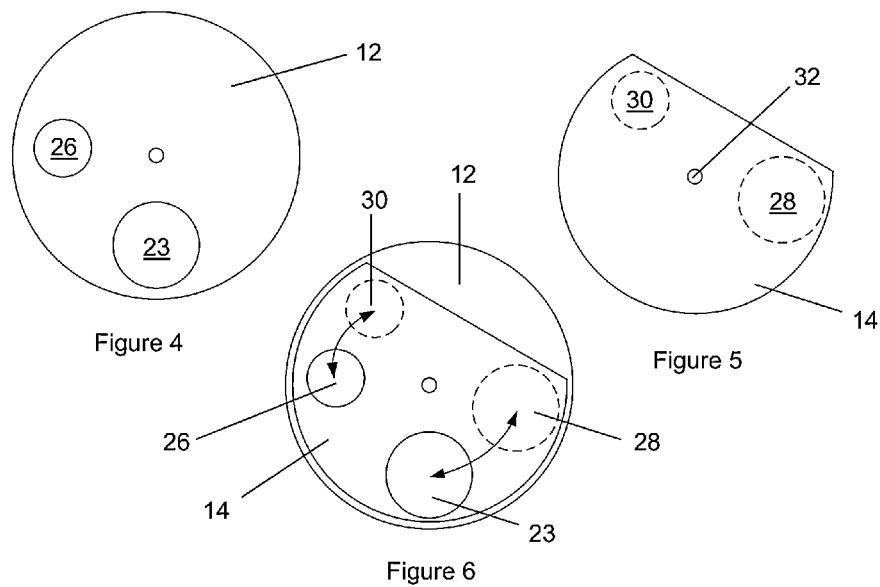
FIG. 4 shows a schematic view of one embodiment of a valve system housing.
FIG. 5 shows a schematic view of one embodiment of a flush plate.
FIG. 6 shows a schematic of a flush plate in place in a housing.

As shown in FIGS. 2 and 5, the plate 14 has a first opening 28 and a second opening 30. The plate openings 28 and 30 are generally positioned as mirror images from the openings 23, 26 of the housing 12, as shown in FIGS. 4 and 5. The plate openings 28 and 30 are generally similarly sized as openings 23, 26 of the housing 12. Although flush plates 14 with two openings are shown, it should be understood that more than two openings may be provided, depending upon the surface area of the flush plate, the size of the openings, and the flush needs required. For example, a flush plate may be provided as having three, four, five, or more openings In one particular embodiment, the openings may be about 1", 1.5", or about 1.75 inches in diameter. In other embodiments, the openings may be from about 1 inch to about 3 inches in diameter, from about 1, 1.5, 2, 2.5, 3, 3.5, 4, 4.5 inches in diameter, and may be as large as 5 or 10 inches in diameter or larger, depending upon the size of the plate 14 and housing 12 and the ultimate use for the valve system. In other embodiments, the openings may as small as a half inch to one millimeter in diameter or smaller, depending upon the size of the plate 14 and housing 12 and the ultimate use for the valve system.

In another particular embodiment, the openings are spaced approximately 135° from one another. In other embodiments, the openings may be spaced from about 80 to about 175° from one another, from about 90 to about 165° from one another, from about 100 to about 155° from one another, from about 120° from one another, from about 130° from one another, from about 140° from one another, from about 145° from one another, from about 150° from one another, or any other appropriate distance as various applications as modified.

The flush plate may be made of any appropriate material. In some instances, the flush plate is metallic, such as stainless steel or titanium. These materials are corrosion resistant, and the plate is in contact with corrosive materials. In other instances, the flush plate may be plastic or any of the above-described materials for the housing. In some embodiments, the flush plate 14 may be coated. For example, a protective coating may be provided that helps give the plate features such as non-corrosion, non-stick, and so forth. In a specific aspect, the plate may be coated with a Teflon coating. In a further specific aspect, the plate may be coated with a non-stick and/or a non-corrosive coating or material. The housing 12 and flush plate 14 may be made of the same or different materials.

Figures 7, 8, 9:
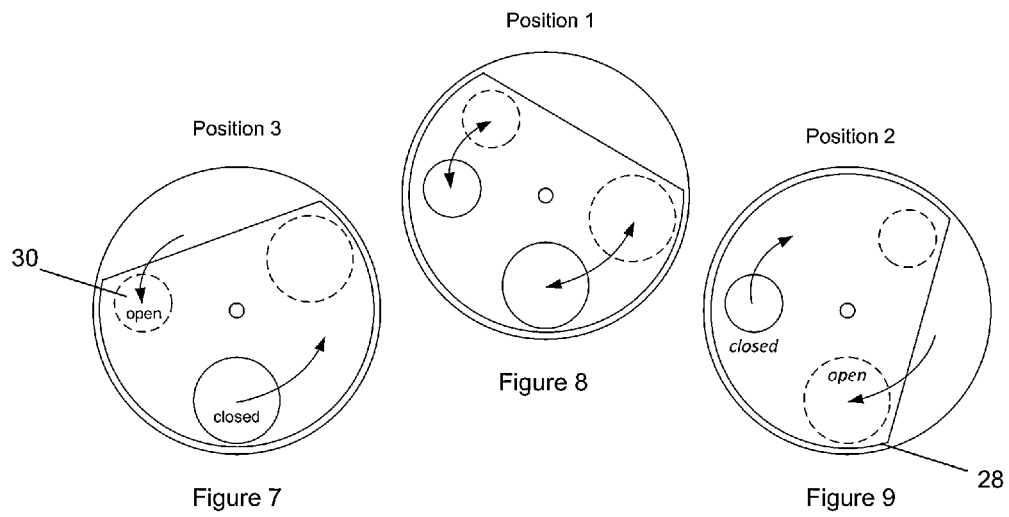
FIG. 7 shows one example of a waste opening of the valve housing being closed but the vent opening being open.
FIG. 8 shows one example of a waste opening of the valve housing being closed and the vent opening being closed.
FIG. 9 shows one example of a waste opening of the valve housing being open but the vent opening being closed.

The plate 14 also has an axis of rotation 32 which allows it to rotate within the housing 12 in order to open and close the housing openings 23 and/or 26. FIG. 6 shows the plate and housing together. As shown in FIG. 8, movement of the flush plate 14 allows the plate openings 28, 30 to leave both housing openings 23, 26 covered. This is referred to as Position 1. In Position 1, the valve system seals the interior of the tank 16 from the vacuum of the sewer line.

When it is time for the tank 16 to be evacuated, the plate opening 28 is moved into alignment with the housing opening 23. This is referred to as Position 2. In Position 2, the valve system 10 opens the interior of the tank 16 to the vacuum of the sewer line. This opens the inlet port 22 and vacuum pulls the waste material/fluid from the tank 16, through the valve system 10, out of outlet 24, and into the sewer pipe line 18. This uncovered position allows the generated vacuum to be activated and flow through valve system 10.

When the tank 16 has been evacuated and it is time for the waste opening 23 of the housing to be closed, the flush plate 14 is moved to the position where the opening 23 is closed. In one embodiment, the plate may be moved back to Position 1. In another embodiment, the flush plate 14 may be used to provide a venting function. The flush plate 14 may be moved so that opening 30 is in alignment with vent opening 26. This is referred to as Position 3. In Position 3, the waste opening 23 is sealed, but the vent opening 26 is open. This position exposes the interior of the tank 16 to vacuum without evacuating the waste. It can allow vacuum to build within the tank.

Figure 10:
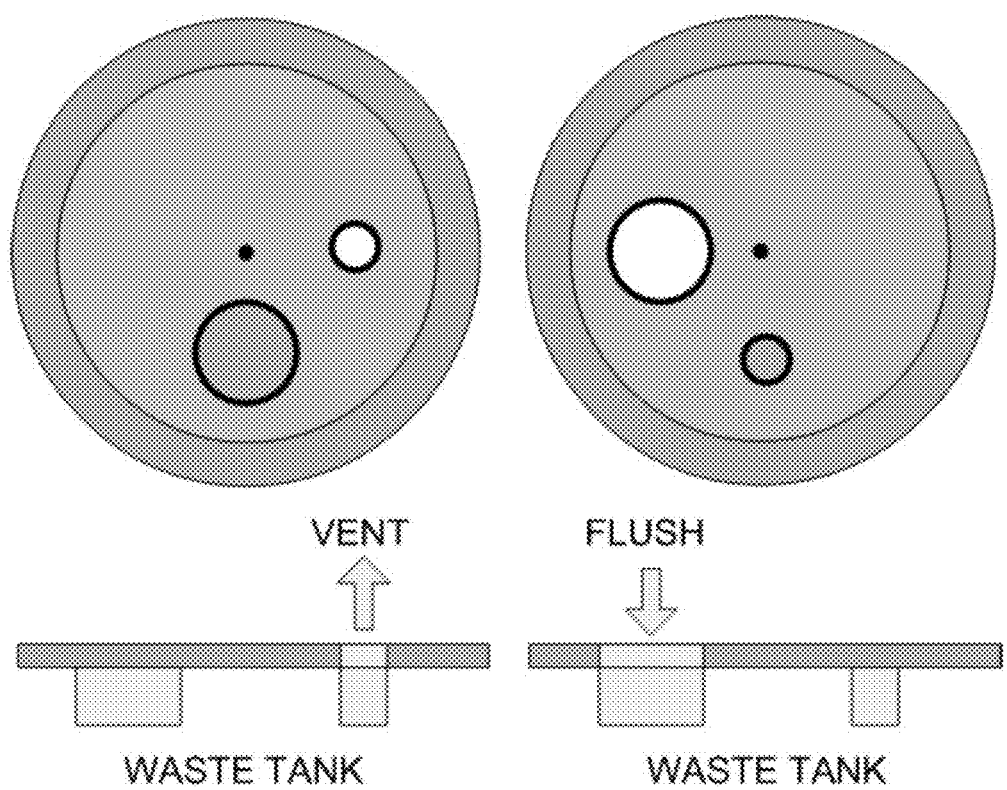
FIG. 10 shows a schematic of the flow of waste through the vent system.

FIG. 10 shows a schematic illustrating the option for allowing venting then movement of the plate for flushing.

On the holding tank 16 side of the valve system 10, a fitting may be bonded to the vent opening 26 to allow control of airflow, velocity, and direction. Such a fitting may also be required in order to meet aerospace requirements for flood-line level. For example, vent 26 may be required to vent to a location above the highest possible flood-level line such that the valve interior will not leak through vent 26 in the case of a catastrophic seal failure. For this purpose, tubing may be attached to a vent fitting on the holding tank 16 side, with the opposing end of the tubing generally located above the flood-level line of the tank 16. The vent may be useful to alleviate the pressure differential that would otherwise encourage media ingestion; vented air is used to further drive flush media from the ingestion pathway.

Movement of the plate 14 may be controlled in any appropriate manner. In one embodiment, movement may be controlled by driving action of an actuator or motor, which is transferred by a gear assembly. A drive mechanism may selectively rotate the flush plate 14 between its various positions. The motor or actuator may be activated by any number of pre-set cues. For example, the movement of plate 14 may be governed by a vacuum or pressure sensor, which senses vacuum pressure and is set to move the flush plate 14 upon a set vacuum level. The movement of plate 14 may be governed by an electrical signal which is set to activate the flush plate 14 upon a set number of flushes or at set time intervals. The movement of plate 14 may be governed by a level sensor, which senses a liquid or waste level in the intermediate holding tank 16 and is set to move the flush plate 14 upon a set level reading. The movement of plate 14 may be governed by a manual override, which allows a user to move the flush plate 14 as desired. The movement of plate 14 may be governed by any appropriate sensor, such as a pressure-based sensor, a capacitance-based sensor, or any other appropriate sensor sufficient to detect the presence or absence of waste in the intermediate holding tank 16.

Figure 13:
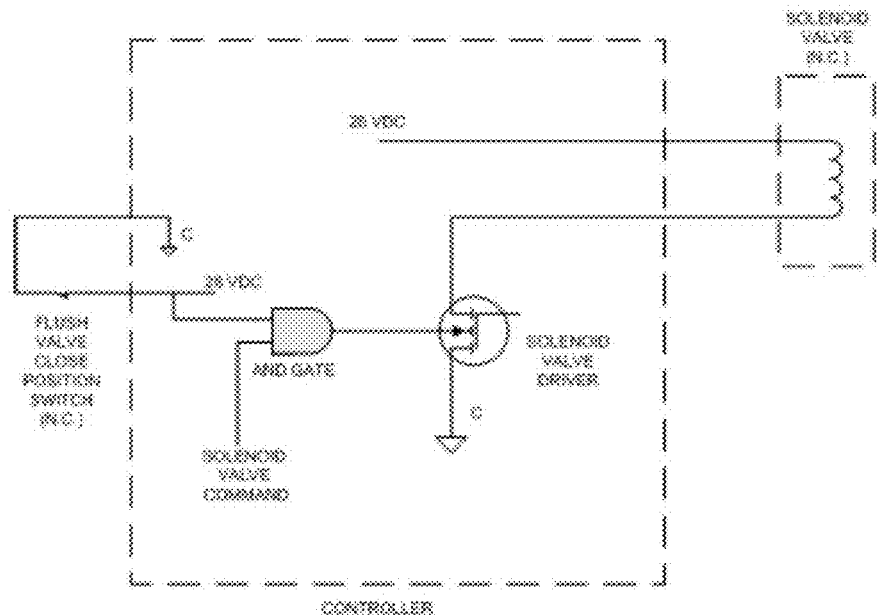
FIG. 13 shows one example of a potential electrical sequence for controlling the valve system.

In one specific system, a vacuum sensor, pressure sensor, electrical sensor, or any other sensor indicates a vacuum level or waste level to the system, indicating that a flush is needed. The system may alternatively be time-based or flush-based, indicating that a flush is needed after a certain amount of time or a certain number of flushes have occurred. The system may alternatively be manually activated, such that one in the lavatory can indicate that the holding tank should be cleared. In any event, a signal is sent to the system controller to indicate that a flush of the tank 16 should occur. The signal may be sent or controlled via a solenoid as shown in FIG. 13. The controller then activates a movement of the flush plate 14 to the Position 2—the flush position. Once the flush of the tank 16 has occurred, the controller can indicate that the plate 14 should move to the waste opening 23 closed position, which is either Position 1 or 3. In Position 1, both the waste opening 23 and the vent 26 are closed, which does not allow any fluid or air flow at all. In Position 3, the tank 16 is exposed to vacuum through vent 26, without evacuating the waste. This may be the default position, depending upon the pressure that the tank 16 is designed to withstand.

The flush plate 14 may also generally be sealed at the interface between the housing interior and the waste system. Any type and number of appropriate seals may be used in connection with the disclosure provided, as long as the seals allow the plate to rotate along its axis of rotation within the housing 12.

Benefits provided by the multi-port valve described include allowing the toilet to conduct a normal flush sequence, but providing a valve system that allows an intermediate holding tank to be used. The intermediate holding tank may hold waste but be flushed as needed, without exposing the entire toilet system to vacuum at all times. This valve design allows the two-stage flush toilet to work more effectively. Other benefits provided are that the valve reduces noise experienced in the cabin and surrounding areas by limiting the exposure of the system to vacuum to only times as needed. The valve may also be designed to open and close quickly, and in many cases, in less than one second and in some instances, in less than a half a second. Another benefit of the valve system is that it seals the cabin from odors when vacuum is not present or being applied. A further benefit it is that it can combine the functionality of two valves into a single valve, allowing the system to be lighter and more compact. One advantage of having a multi-port orbital valve is that it can manage sequences of open and shut positions during the transfer of waste and eliminates the use of multiple single valves for managing each open and shut position. This saves weight and space on an aircraft waste handling system. FIG. 13 shows one embodiment of an electrical schematic involving various solenoid valves and gates in order to manage the running sequences of the multi-port valve system 10.

The valve system design generally controls the vacuum/pressure system of the waste management system for transporting waste from the toilet to the main waste tank onboard the aircraft. If the transfer of the waste from the toilet to the main waste tank is conducted via an intermediate holding tank, a two-stage flush is used.

Changes and modifications, additions and deletions may be made to the structures and methods recited above and shown in the drawings without departing from the scope or spirit of the invention and the following claims.

What is claimed is:

1. A valve, comprising:
   (a) a valve housing enclosing a flush plate;
   (b) the valve housing comprising a first opening and a second smaller vent opening;
   (c) the flush plate comprising a half-moon shape, a first opening, a second smaller vent opening, and an axis of rotation,
   wherein rotation of the flush plate with respect to the axis of rotation either (i) closes the first and second openings of the housing, (ii) allows the first opening of the housing to be open by aligning the first opening of the housing with the first opening of the flush plate, or (iii) allows the second opening of the housing to be open by aligning the second smaller vent opening of the housing with the second smaller vent opening of the flush plate, such that
      wherein the flush plate prevents both the first and second openings of the housing from being simultaneously open.

2. The valve of claim 1, wherein movement of the flush plate is activated by a vacuum sensor, a pressure sensor, a capacitance sensor, or a level sensor.

3. The valve of claim 1, wherein movement of the flush plate is activated by a manual activation feature.

4. The valve of claim 1, wherein the position of the first and second openings on the housing correspond in size and spacing to the first and second openings of the flush plate.

5. The valve of claim 1, wherein when the first opening of the housing is aligned with the first opening of the flush plate, the second opening of the housing cannot be aligned with the second opening of the flush plate.

6. The valve of claim 1, wherein the housing comprises at least one additional opening.

7. The valve of claim 1, wherein the housing comprises a metallic material.

8. The valve of claim 1, wherein the housing comprises plastic, a thermoplastic resin, a polymeric material, polyetherimide, nylon, polypropylene, acrylonitrile butadiene styrene, polyethylene, stereolithography resin, carbon composite material, carbon fibers in an epoxy matrix, polycarbonate, or any combination thereof.

9. The valve of claim 1, wherein the flush plate comprises a metallic material.

10. The valve of claim 1, wherein the flush plate comprises plastic, a thermoplastic resin, a polymeric material, polyetherimide, nylon, polypropylene, acrylonitrile butadiene styrene, polyethylene, stereolithography resin, carbon composite material, carbon fibers in an epoxy matrix, polycarbonate, or any combination thereof.

11. The valve of claim 1, wherein the flush plate comprises plastic, a thermoplastic resin, a polymeric material, polyetherimide, nylon, polypropylene, acrylonitrile butadiene styrene, polyethylene, stereolithography resin, carbon composite material, carbon fibers in an epoxy matrix, polycarbonate, or any combination thereof.

12. A valve for use on a vacuum toilet that cooperates with a waste tank under vacuum, the valve comprising:
   (a) a valve housing enclosing a flush plate;
   (b) the valve housing comprising a first opening and a second smaller vent opening;
   (c) the flush plate comprising a half-moon shape, a first opening, a second smaller vent opening, and an axis of rotation,
   wherein rotation of the flush plate with respect to the axis of rotation either (i) closes the first and second openings of the housing, (ii) allows the first opening of the housing to be open by aligning the first opening of the housing with the first opening of the flush plate, or (iii) allows the second opening of the housing to be open by aligning the second smaller vent opening of the housing with the second smaller vent opening of the flush plate, such that the waste tank is exposed to vacuum through the second smaller vent opening without evacuating waste from the vacuum toilet,
      wherein the flush plate prevents both the first and second openings of the housing from being simultaneously open.

* * * * *